(No Model.)

C. W. SHERBURNE.
TRACK SANDING APPARATUS.

No. 487,497. Patented Dec. 6, 1892.

WITNESSES
J. M. Dolan
M. Lynch

INVENTOR
Chas. W. Sherburne
by his attys
Clarke & Raymond

UNITED STATES PATENT OFFICE.

CHARLES W. SHERBURNE, OF BOSTON, MASSACHUSETTS.

TRACK-SANDING APPARATUS.

SPECIFICATION forming part of Letters Patent No. 487,497, dated December 6, 1892.

Application filed October 3, 1892. Serial No. 447,609. (No model.)

*To all whom it may concern:*

Be it known that I, CHARLES W. SHERBURNE, a citizen of the United States, residing at Boston, in the county of Suffolk, in the State of Massachusetts, have invented a new and useful Improvement in Track-Sanding Apparatus, of which the following is a full, clear, and exact description, reference being had to the accompanying drawings, sufficient to enable others skilled in the art to make and use my invention without other invention on their part.

This apparatus is an improvement or variation of a track-sanding apparatus described in an application for patent already filed, and is distinguished from that by calling this "Case C." Like the previous case, it represents a modification of the valve at present in use upon a locomotive for controlling the supply of sand to the driving-wheels.

Figure 1:
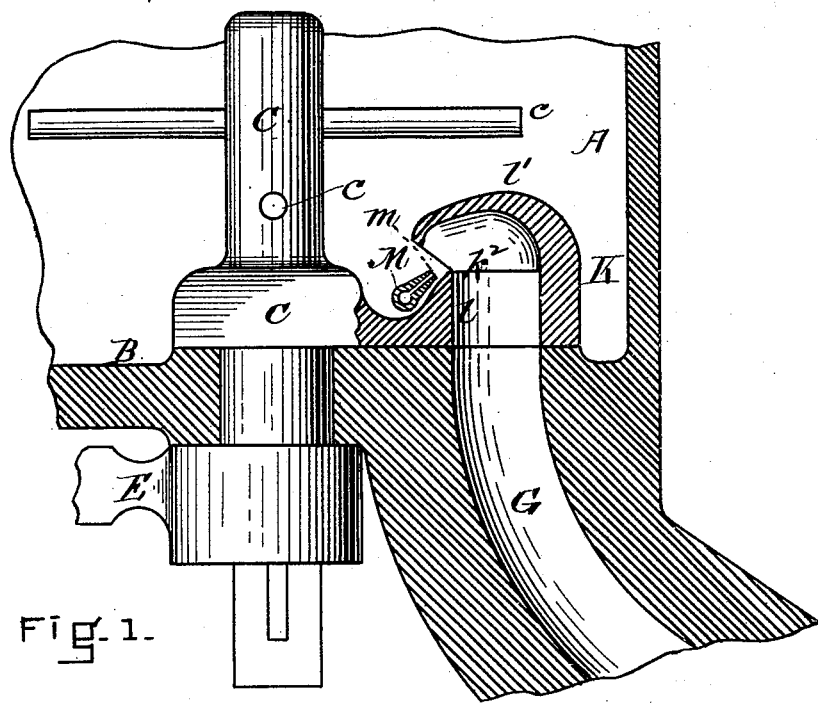
Figure 2:
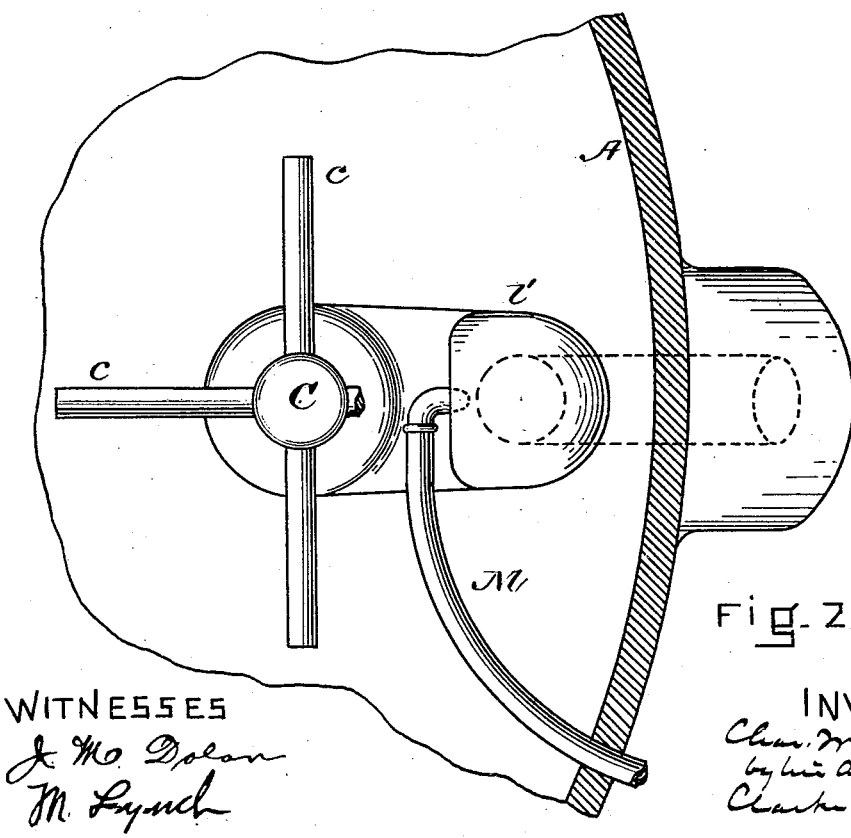

In the drawings, Figure 1 is a vertical section, and Fig. 2 is a plan, of this improvement.

A represents the walls of the present sand-box.

B represents the floor.

C is the stem of the sand-valve, and $c$ the stirring-pins attached to the said stems.

E is the segment-gear by which the stem is actuated by means of another segment-gear and lever, as is familiarly known.

G is the sand-pipe leading in front of the locomotive or car wheels.

K is the valve, which is cored out so as to present a cover $l'$ and a base $l$. This cover, as will be seen in Fig. 2, is in the form of a hood with its opening toward the stem C. On the inside of the valve is a high raised seat $k^2$, forming a trap for the sand, and in the bottom of that trap is a nozzle $m$, which is connected with an air-pipe M, and blows the sand up over the edge of the trap $k^2$ into the sand-pipe G.

The main difference between this apparatus and the apparatus described in the other application is that in this the sand is trapped below the hood $l'$ in the hollow of the raised seat $k^2$, formed by the raised seat, and is blown over the wall into the sand-pipe G by means of a blast-nozzle in the bottom of the trap. In the other case the sand is not trapped and the blast-nozzle is directed horizontally, so as to stir the sand and direct it forward without lifting it.

Having thus fully described my invention, I claim and desire to secure by Letters Patent of the United States—

The swing-valve K, formed with a hood $l'$ and a trap $k^2$ and having the air-pipe M and air-nozzle $m$ within said trap, substantially as and for the purposes described.

CHARLES W. SHERBURNE.

Witnesses:
F. F. RAYMOND, 2d.
J. M. DOLAN.